United States Patent
Hara et al.

(10) Patent No.: US 6,560,221 B1
(45) Date of Patent: May 6, 2003

(54) COMMUNICATION PATH CONTROL DEVICE, COMMUNICATION PATH CONTROL METHOD, AND COMMUNICATION PATH CONTROL UNIT

(75) Inventors: Kazuhiro Hara, Tokyo (JP); Ichiro Kubota, Kanagawa (JP); Yasuaki Yamagishi, Kanagawa (JP); Noboru Fujii, Miyagi (JP); Akihiro Uetake, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/147,225

(22) PCT Filed: Mar. 6, 1998

(86) PCT No.: PCT/JP98/00940

§ 371 (c)(1),
(2), (4) Date: Mar. 15, 1999

(87) PCT Pub. No.: WO98/39896

PCT Pub. Date: Sep. 11, 1998

(30) Foreign Application Priority Data

Mar. 7, 1997 (JP) .......................................... 09-070453

(51) Int. Cl.[7] .......................... H04L 12/56; H04L 12/66
(52) U.S. Cl. ...................... 370/352; 370/401; 370/465
(58) Field of Search ................................ 370/316, 352, 370/353, 354, 355, 401, 437, 465, 471, 480, 420, 419, 392, 393; 709/227

(56) References Cited

U.S. PATENT DOCUMENTS

| | | | | |
|---|---|---|---|---|
| 5,504,816 A | * | 4/1996 | Hamilton et al. | 380/217 |
| 5,526,435 A | * | 6/1996 | Tsumura | 380/211 |
| 5,852,721 A | * | 12/1998 | Dillon et al. | 370/401 |
| 5,987,518 A | * | 11/1999 | Gotwald | 709/230 |
| 5,991,292 A | * | 11/1999 | Focsaneanu et al. | 370/352 |

* cited by examiner

Primary Examiner—Chau Nguyen
Assistant Examiner—Soon-Dong Hyun
(74) Attorney, Agent, or Firm—Jay H. Maioli

(57) ABSTRACT

A data path control device with a first interface section for connecting to a LAN, second interface section for connecting to an external network through a small transmission capacity two-way line such as a telephone line, and third interface section for receiving a large capacity data from a large transmission capacity one-way line such as a satellite broadcast line. The data path control device changes the sender address of the data transmitted from a computer to a network based on a previously set correspondent relationship, thereby controls the path so that the large capacity data from the network is transmitted through the large transmission capacity one-way line. A path of the reply data from a network responsive to the request data from a computer outputted to an external network is selected by the computer side, and in the case that the reply data is composed of large capacity data, a satellite line having a large transmission capacity can be selected.

29 Claims, 14 Drawing Sheets

| DESTINATION HOST OR ADDRESS OF NETWORK | SUB-NET MASK | ADDRESS OF DESTINATION | INTERFACE |
|---|---|---|---|
| 43. 0. 20. 0 | 255. 255. 255. 0 | DIRECT DISTRIBUTION | ETHERNET |
| 133. 11. 9. 39 | 255. 255. 255. 255 | 43. 0. 20. 254 | ETHERNET |
| 202. 213. 206. 0 | 255. 255. 255. 0 | 43. 0. 20. 10 | ETHERNET |
| 133. 138. 20. 0 | 255. 255. 255. 0 | 133. 138. 20. 2 | TELEPHONE LINE |
| DEFAULT | | 133. 138. 20. 2 | TELEPHONE LINE |

FIG.8

| | 91 | 92 | 93 | 94 | 95 | 96 |
|---|---|---|---|---|---|---|
| DECISION CRITERIA | IP ADDRESS | SUB-NET MASK | PORT NO. | RETURN PATH | | |
| DESTINATION | 133. 11. 9. 39 | 255. 255. 255. 255 | | SATELLITE LINE | | |
| DESTINATION | 133. 11. 9. 0 | 255. 255. 255. 0 | | TELEPHONE LINE | | |
| DESTINATION | | | 20/tcp | SATELLITE LINE | | |
| DESTINATION | 202. 232. 266 | 255. 255. 255. 255 | 23/tcp | TELEPHONE LINE | | |
| SENDER | 43. 0. 20. 37 | 255. 255. 255. 255 | | SATELLITE LINE | | |
| DEFAULT | | | | TELEPHONE LINE | | |

FIG.9

| LAND SIDE | | INTERNET SIDE | | |
|---|---|---|---|---|
| IP ADDRESS | PORT NO. | IP ADDRESS | PORT NO. | |
| 43. 0. 20. 1 | 20/tcp | 133. 138. 20. 2 | 20/tcp | } 101 |
| 43. 0. 20. 2 | | 202. 213. 206. 2 | | } 102 |

FIG.10

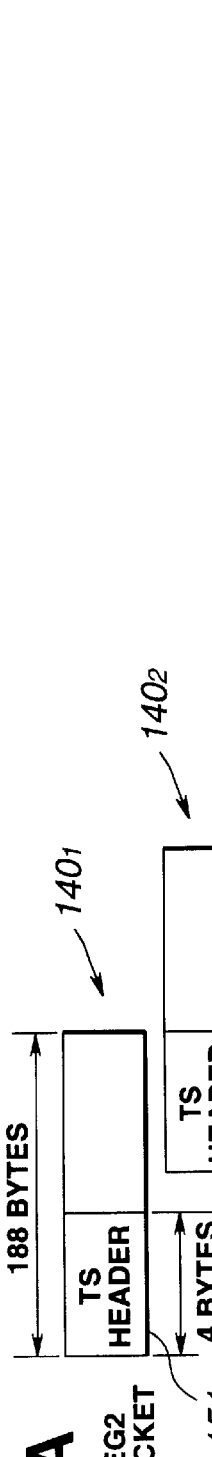
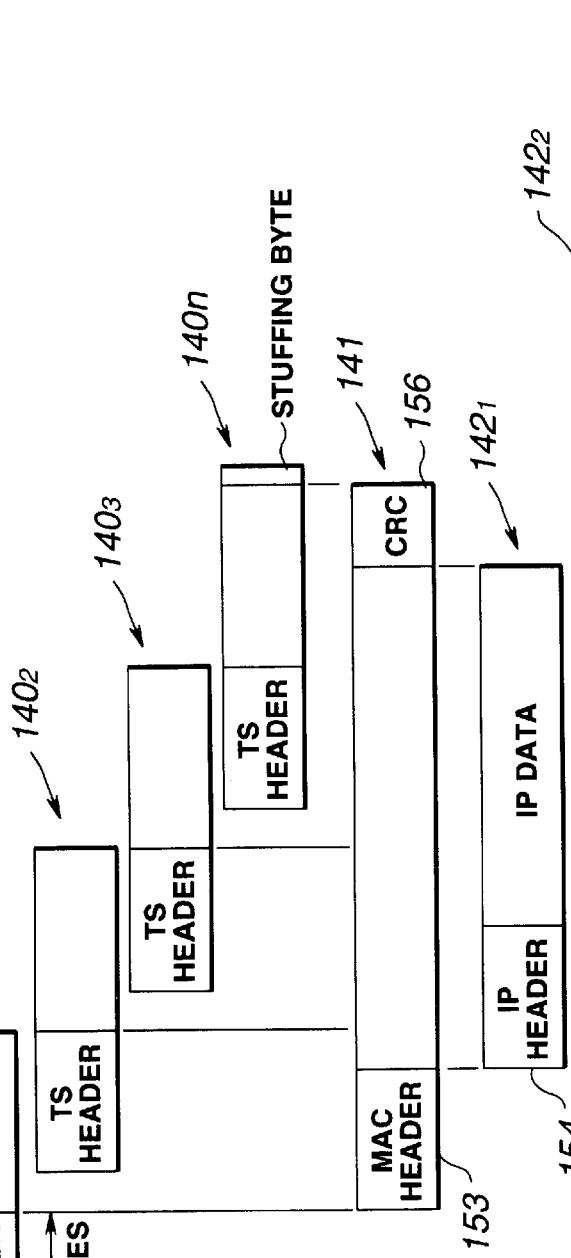
FIG.14A MPEG2 TS PACKET
FIG.14B MAC FRAME (DAVIC SPEC.)
FIG.14C FRAGMENTED IP PACKET
FIG.14D RESTRUCTURED IP PACKET

COMMUNICATION PATH CONTROL DEVICE, COMMUNICATION PATH CONTROL METHOD, AND COMMUNICATION PATH CONTROL UNIT

TECHNICAL FIELD

This invention relates to a communication path control device and communication path control method, and communication path control unit for data distribution service from a network using the telephone line and broadcast line.

BACKGROUND ART

The analog telephone line and digital telephone line such as ISDN are usually used as the line for between home computers and the external network. However, the data transmission rate of the public data network ranges around as low as 30 kbps for analog telephone line used through a modem, and is as low as 64 kbps or 128 kbps for the digital line such as ISDN. Hence, it takes a long time of several minutes to several ten minutes to transmit large volume data of an image after access (dial-up connection) to an external network through a public line. In particular, various service supplied from the Internet often contain images and the desired information cannot be down-loaded in a short time, such slow transmission can result in reduced efficiency and attractiveness. Therefore, it is desirable to use a large capacity line in order to transmit large volume data at a high rate between a computer and external network such as Internet.

The privately used digital line, CATV (wired television) line using a co-axial cable, and satellite broadcast line are available as large volume line usable for data transmission between computers and external networks.

The privately used digital line is a high rate digital line installed separately from the public line network, and is a line which a user who has a private contract with a communication provider can use exclusively. Recently, some home communication users use privately used digital lines for connecting to the Internet.

The CATV line is a line used for transmission of broadcast programs installed between home users and a broadcast provider. The line comprises usually a co-axial cable which is a capable of two-way data communication, in some cases two-way communication is carried out between a program distributor side and a receiving side using one co-axial cable.

On the other hand, the satellite broadcast line is a one-way line for distributing broadcast programs from one broadcasting satellite to a multitude of users. Therefore, in the case that the satellite broadcast line is used as communication path for transmitting/receiving data between computers and an external network, it is required to also use a terrestrial two-way line such as public line or privately used line. It is therefore difficult to connect an arbitrary computer to a satellite line through a public line.

A receiving device for receiving the data transmitted from a satellite line to a computer is structured generally so as to be connected to a specific type of computer using a privately used line.

Further, in the case that computers constitute a network such as a LAN (Local Area Network), it is usual that a computer is connected to an external network through a path control device called a router which is used for controlling an access path between the network.

In the case that a plurality of access paths are available between a computer and an external network, the router is provided with a function to select a path out of the plurality of access paths based on, for example, the address of the data. However, a conventional router is not provided with a function to control the return path of a return data from the external network to the data transmitted from an arbitrary computer.

As described herein above, in the case that data are transmitted/received through a plurality of communication apparatus or communication paths, a communication path control means is required to control the communication path. However, conventional communication path control means is poor in flexibility because such a communication path control means is structured usually using a computer.

In the case of broadcast data transmitted from a satellite line, a user other than specific user who has a reception contract can easily receive it. Therefore, the above-mentioned receiving device should have a function for scrambling so that a specific user can receive the data correctly and a user who does not have a reception contract can not receive it.

DISCLOSURE OF THE INVENTION

The present invention was accomplished in view of the above-mentioned problems. It is the object of the present invention to provide a communication path control device and communication path control method provided with a function to control the communication path of data between networks and additionally data reception function from a satellite line.

The communication path control device of the present invention proposed to solve the above-mentioned problem is a communication path control device for controlling communication paths between the first network and second network provided with the first interface section for connecting to the first network, the second interface section for connecting to the first communication path for two-way data transferring between the second network, the third interface section for connecting to the second communication path having a transmission capacity larger than the first communication path for one-way data transmission from the second network to the first network, and a control means for selecting any one of the first communication path and second communication path as the return path of the reply data responsive to the transmitted data based on the data transmitted from the first network to the second network through the first communication path.

The communication path control method of the present invention proposed to solve the above-mentioned problem is a communication path control method for controlling communication paths between the first network and second network comprising the first transfer step for transferring the data inputted from the first network through the first interface section to the second interface section, the second transfer step for transferring the data from the second interface section to the first communication path served for two-way data transmission between the second network, and the third transfer step for outputting the reply data responsive to the data addressing to the third interface section from the second communication path for one-way transmitting the data from the second network to the first network having a transmission capacity larger than the first communication path, wherein the return path of the reply data responsive to the transmitted data is specified based on the data transmitted from the first network to the second network through the first communication path.

According to the communication path control device and method, the path of the reply data responsive to the data transmitted from an arbitrary computer to a network is controlled, therefore, in the case that a large capacity data is down loaded, a large capacity one-way line is designated for short time data transfer, thus the network is operated efficiently.

The communication path control unit of the present invention proposed to solve the above-mentioned problem is a communication path control unit for controlling communication paths between a local area network and the Internet provided with the first interface section having the first connection section for connecting to the local area network, the second interface section having the second connection section for connecting to the first communication path for two-way data transmission between the Internet, the third interface section having the third connection section for connecting to the second communication path for one-way data transmission from the Internet to the local area network, a reception means for receiving the satellite broadcast data inputted to the third interface section, a control information memory means for storing the previously set relationship between the address information of the local area network and port number information, and the address information of the Internet and port number information, and a control means for selecting any one of the first communication path and the second communication path as the return path of the reply data responsive to the transmitted data based on the data transmitted from the local area network to the Internet through the first communication path.

According to the communication path control unit of the present invention, the plurality of interface sections such as the interface section for satellite lines provided with the data reception function from satellite lines, interface section for a LAN, and interface section for telephone lines, and the communication path control function for selecting a communication path between them based on the transmitted data are contained in a compact box, and further line connection terminals of the respective interfaces are structured on the box panel using universal connectors and thereby, the communication path control unit of the present invention is served as a communication path control device for various computers regardless of the type of a computer.

BRIEF DESCRIPTION OF THE DRAWINGS

FIG. 8 is a diagram for illustrating an example of a path control table.

FIG. 9 is a diagram for illustrating an example of a path control table.

FIG. 10 is a diagram for illustrating an example of an address conversion table.

FIGS. 14A to 14D are diagrams for describing the format of the data transmitted through a satellite line.

BEST MODE FOR CARRYING OUT THE INVENTION

Preferred embodiments of a communication path control device, communication path control method, and communication path control unit of the present invention will be described in detail hereinafter with reference to the drawings.

Figure 1:
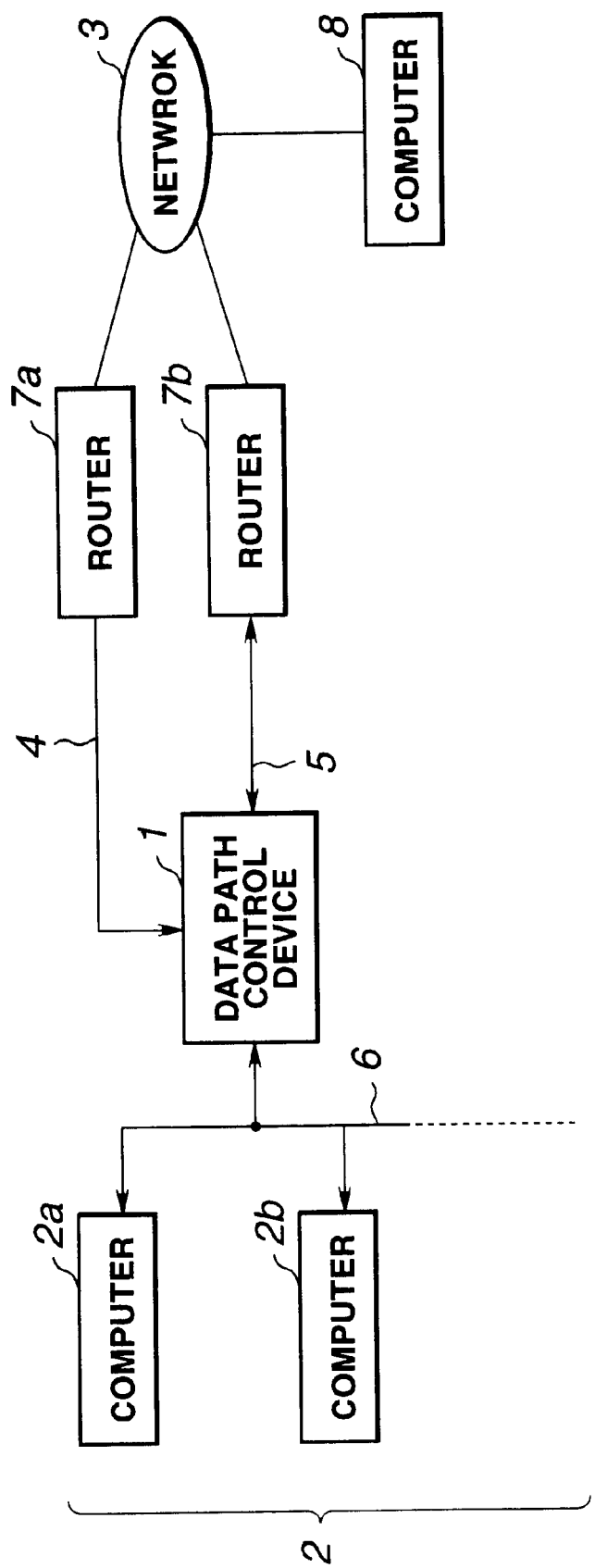
FIG. 1 is a diagram for illustrating a basic exemplary connection for performing path control of the data transmitted/received between a computer and external network using a data path control device in accordance with the present invention.

FIG. 1 shows an exemplary basic connection for performing path control of the data transmitted/received between a computer and an external network using a data path control device 1 which is one embodiment of the communication path control device of the present invention. Herein, the case that data are transmitted/received between a computer 2 connected to a LAN (Local Area Network) 6 designated as the first network and a computer 8 connected to a network 3 designated as the second network is described as an example.

The data path control device 1 is a communication path control device for performing path control of the data transmitted/received between the computer 2 and the network 3, and is provided with the first interface section for connecting to the LAN 6, the second interface section for connecting to the network 3, and the third interface section for receiving large capacity data from a satellite broadcast line or a CATV line.

The above-mentioned second interface section is connected to a small transmission capacity two-way line 5, and connected to the network 3 through a router 7b. The above-mentioned third interface section is connected to a large transmission capacity one-way line 4, and connected to the above-mentioned second network 3 through a router 7a. The above-mentioned respective interface sections will be described hereinafter.

Computers 2 include a plurality of computers 2a, 2b, . . . which are mutually connected through LAN 6. In FIG. 1, only two computers: 2a and 2b are illustrated. However, any number of computers may be connected through the LAN 6 if the computers are within the range that satisfies the standard of the LAN 6. Further, any models of a plurality of the above-mentioned computers may be selected if the models satisfy the standard of the LAN 6.

The network 3 comprises computers connected each other with communication lines for transmitting/receiving data, and the Internet is the representative example. The computer 8 is connected to the network 3.

The small capacity two-way line 5 is the first communication path for transmitting/receiving data between the data path control device 1 and network 3, and is connected to a server not shown in the drawing through the router 7b. The small capacity two-way line 4 is, in detail, an analog telephone line having the maximum data transmission rate of about 30 kbps or digital telephone line having the maximum data transmission rate of 64 kbps or 128 kbps. A digital leased line is used as the small capacity two-way line 5 in some cases.

The large capacity one-way line 4 is the second communication path for transmitting a large capacity data (down load) from the network 3 to the LAN 6, and is connected to the network 3 through the router 7b having a function to send out data supplied from a server not shown in the drawing and network 3. The large capacity one-way line 4 is, in detail, a CATV line or satellite broadcast/ communication line, the maximum data transmission rate is about 30 Mbps in the case that one transponder of a communication satellite is used entirely.

The LAN 6 is the first network which connects between the data path control device 1 and the computer 2, and usually comprises a general-purpose line. Herein, the LAN 6 having a bus-type structure is exemplified, however the LAN 6 may have a ring-type or star-type structure as required. The LAN 6 is structured so that various standards such as Ethernet, First Ethernet, and IEEE1394, and ATM (Asynchronous Transfer Mode) and USB (Universal Serial Bus) are used. Further, the LAN may be structured as a radio LAN or PHS-LAN. These are described hereinafter.

Next, the structure of the data path control device 1 is described.

Figure 2:
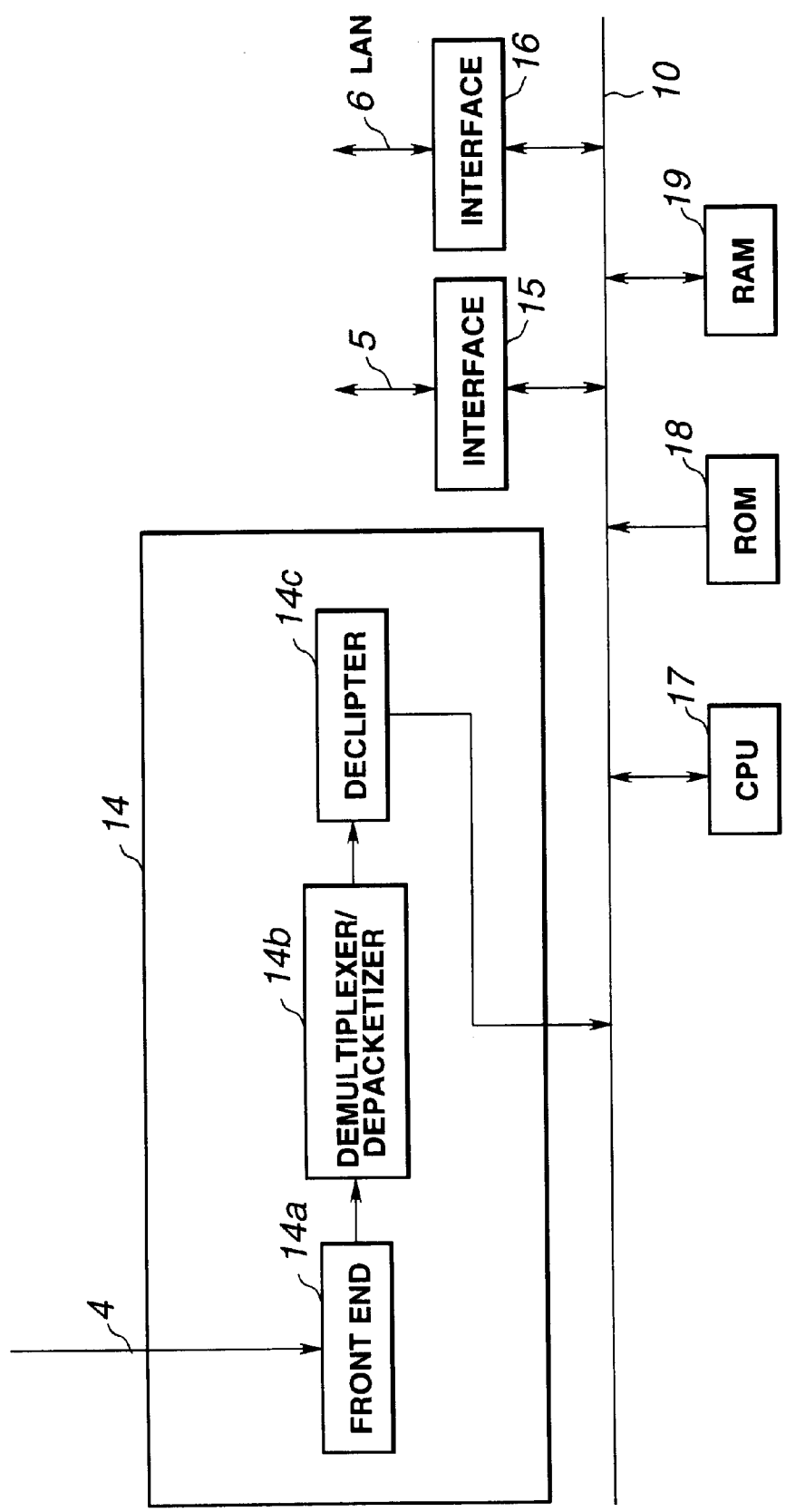
FIG. 2 is a block diagram for illustrating the structure of a data path control device in accordance with the present invention.

FIG. 2 is a block diagram for illustrating the structure of the data path control device 1. The data path control device 1 is a communication path control device for controlling the path of the data transmitted/received between the computer 2 and the network 3, and is provided with an interface section 14 for transmitting/receiving large capacity data sent from a satellite broadcast line or a CATV line, second interface section 15 for connecting to a server of the network 3 through the router 7b, and interface section 16 for connecting to the LAN 6. The data path control device 1 is provided with a CPU 17, a ROM 18, and a RAM 19. The above-mentioned components are connected to a bus 10, and output/input the data and control signals through the bus 10.

The interface section 14 is an interface of the large capacity one-way line 4 such as a satellite line, and is provided with a front end 14a, demultiplexer/depacketizer 14b, and declipter 14c.

The front end 14a is a portion where data from the large capacity one-way line 4 is inputted, performs processing such as demodulation on the input signal, and sends it to the demultiplexer/depacketizer 14b.

The demultiplexer/depacketizer 14b is a component which separates the multiplexed input data and returns it to a packet, and extracts the data portion from the packet. The extracted data portion is sent to the declipter 14C.

The declipter 14c descrambles the scrambled data transmitted from the demultiplexer/depacketizer 14b. The declipter 14c is provided with a key used for descrambling which is specific for the data path control device 1. The scrambled data, which will not be descrambled by other data path control devices, is descrambled using the key. The data descrambled here is transmitted to the interface section 16 through the bus 10.

The interface section 15 is an interface for connecting to the small capacity two-way line 5 such as terrestrial public lines. More specifically, this is a modem for connecting to an analog telephone line or TA (Terminal Adapter) for connecting to a digital telephone line such as ISDN. Data is transmitted/received between the LAN 6 and network 3 through this interface section 15.

The interface section 16 is an interface for connecting to the LAN 6 to which computers 2 are connected. In detail, this is a component such as a network card of Ethernet of 10 BASE-T attached to a slot of a computer. Through this interface section 16, the data transmitted from the LAN 6 is transmitted to the CPU 17 through the bus 10, or the data transmitted from the network 3 through the large capacity one-way line 4 or small capacity two-way line 5 is transmitted to the LAN 6.

The CPU 17 is monitoring data transmitted from the LAN 6. Comparing the content with the information registered in the RAM 19, the CPU 17 judges whether the data should be transmitted to the small capacity two-way line 5 without changing the data or should be transmitted to the small capacity line 5 with changing the information of a sender contained in the transmitted data. This function is described hereinafter.

The CPU has also a judgement function to assist the data path control device 1 with performing data path control as a usual router.

The ROM 18 stores a program for specifying the operation of the CPU 17.

The RAM 19 is a control information memory means for storing the information referred when the CPU performs path control. The information stored in the RAM 19 is, for example, a table to be referred to when an IP (Internet Protocol) address, which will be described hereinafter, is changed. A routing table which is referred to when usual path control of the Internet is performed between the small capacity two-way line 5 and LAN 6 is stored also in the RAM 19. For storing excessive information to be stored in the RAM 19, a secondary memory device such as hard disk drive may be used in combination.

Figure 3:
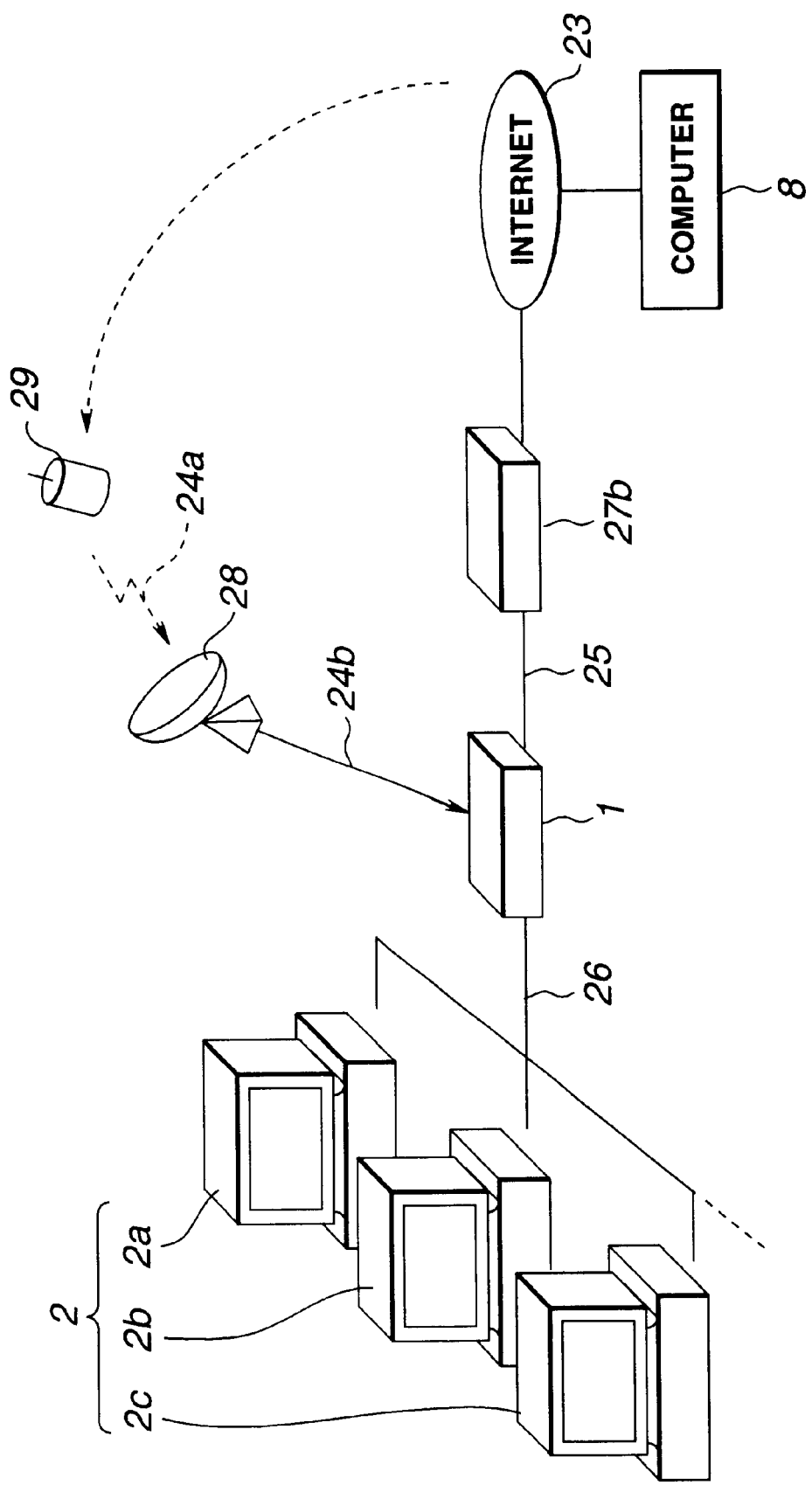
FIG. 3 is a diagram for illustrating a detailed exemplary connection of the data path control device in accordance with the present invention.

FIG. 3 shows a detailed exemplary connection for path controlling of the data transmitted/received between a computer and an external network using the data path control device 1 which is one embodiment of the communication path control device of the present invention.

In this case, the network in FIG. 1 is the Internet 23, the large capacity one-way line 4 is a satellite line 24a and a coaxial cable 24b, and the LAN is the Ethernet 26. The same components in FIG. 3 as described in FIG. 1 are given the common characters described in FIG. 1 and detailed description is omitted, and components other than that described in FIG. 1 is described mainly.

The data path control device 1 is provided with an interface section for connecting to the Ethernet 26, interface section for connecting to the Internet 23 through a dial-up router 27b of an Internet service provider who is a business operator involved in intermediation to connect to the Internet, and interface section for connecting to the coaxial cable 24b for receiving data from a communication satellite 29 through a satellite line 24a and a reception antenna 28.

The Internet 23 is the world wide computer network, and provides various services.

The satellite line 24a is a large capacity one-way line which utilizes the communication satellite 29. The data transmitted from the communication satellite 29 through the satellite line 24a are received by the terrestrial antenna 28, and transmitted to the data path control device 1 through the coaxial cable 24b.

The Ethernet 26 is a standard system of the LAN (Local Area Network) structured using personal computers, can be used for multiple purposes, and connected to various computers.

A standard called as 10 BASE-T having a data transfer rate of 10 Mbps is used heretofore for the Ethernet, but it is desirable to use the Fast Ethernet such as 100 BASE-TX having a data transmission rate of 100 Mbps or a high rate LAN such as 100 VG-AnyLAN in order to receive and use efficiently the data transmitted at high rate from the large capacity one-way lines 24a and 24b. Further, it is possible to use the IEEE1394, USB (Universal Serial Bus), radio LAN, or PHS-LAN which are now popular. Herein the bus-type LAN is exemplified, but another structure such as a token ring may be used instead.

The computer 2 can accept various LAN standards and can take an access to the Internet through the LAN and data path control device 1 regardless of the type of a computer as long as the computer has a function to connect to the Internet. For example, a built-in Ethernet card for 10 BASE-T is provided in the data path control device 1 for using the Ethernet of 10 BASE-T as the LAN.

It is possible to use a leased line for connecting to the Internet instead of the telephone line 25.

In the case that the telephone line 25 is an analog or digital public line, the computer is connected to the Internet 23 through an Internet service provider and dial-up connection using a communication protocol such as ppp (point-to-point protocol). The dial-up router 27b of the service provider side is connected to the Internet, and the data path control device 1 is connected to the dial-up router 27b through the telephone line 25.

It is assumed that a modem for connecting to an analog line, a TA (Terminal Adapter) for connecting to digital line, and protocol stack such as ppp required for dial-up connection are built in the interface section of the data path control device 1.

The above-mentioned data path control device 1 may be structured by attaching, for example, an interface board for satellite communication to an extension slot of the computer. However, such structure requires a computer and is inconvenient due to poor versatility because the specifications of the interface board for satellite communication are different depending on the type of a computer. Therefore it is desirable to provide the structure having the above-mentioned data path control device 1 in a compact box for serving as a widely versatile communication path control unit.

Figure 4:
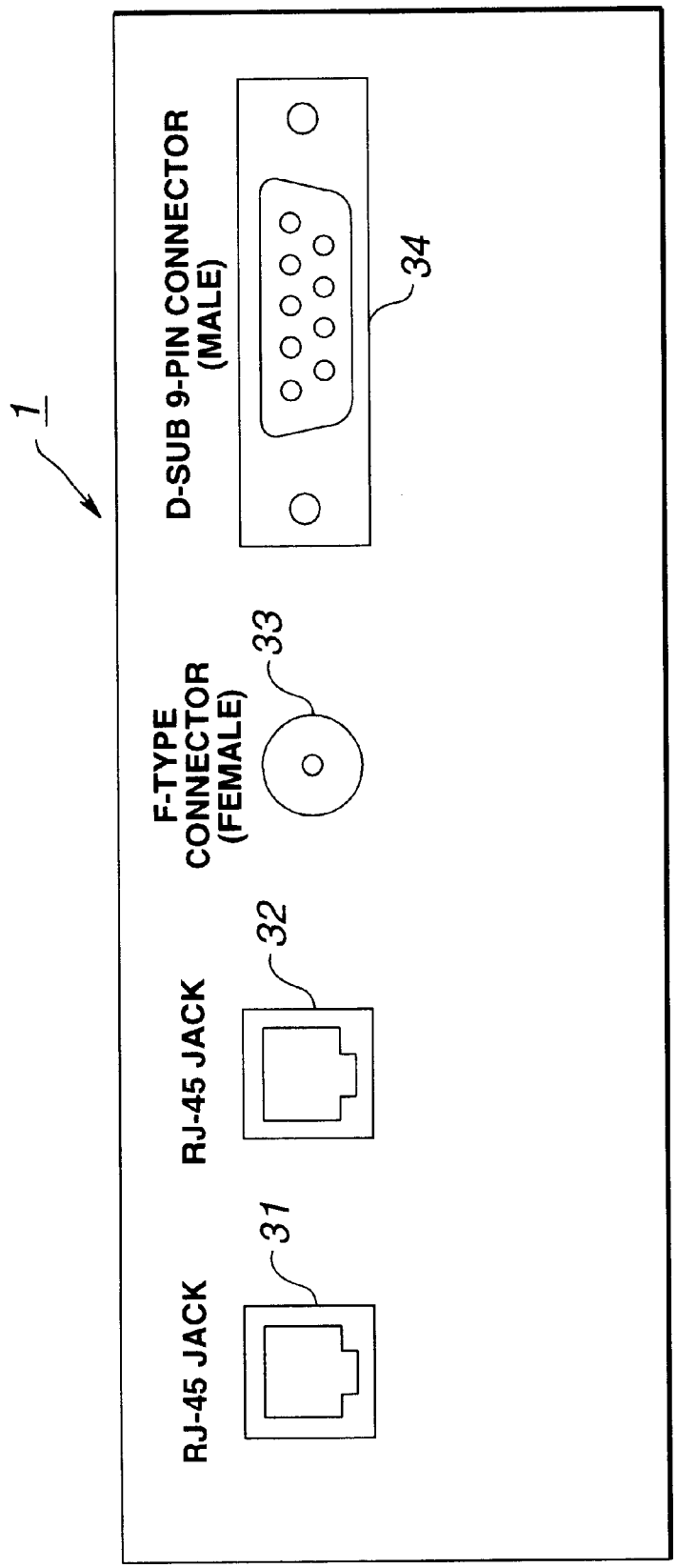
FIG. 4 is a diagram for illustrating the detailed exemplary structure of line connection terminals provided on the box panel of the data path control unit of the present invention.

FIG. 4 is a diagram for illustrating one side of the box panel of the communication path control unit in accordance with the present invention having a compact structure.

The connector 31 is a terminal for connecting the telephone line to the dial-up router 27b of the Internet service provider, and herein a RJ-45 type jack is used. This telephone line may be an analog line, but a digital public line such as ISDN or a digital leased line for high rate Internet dial-up connection may be desirably used.

The connector 32 is a terminal for connecting to the Ethernet 26, and an RJ-45 type jack is used like the connector 31.

The connector 33 is a connector for receiving large capacity data transmitted from the communication satellite 29 through the satellite 24a, a reception antenna 28, and the coaxial cable 24b, and herein a F-type connector is used. The received data inputted from the connector 33 is subjected to processing such as demodulation in the interface section 14.

The connector 34 is a serial interface for connecting to a terminal for setting the data path control unit, and is not necessarily needed. The connector 34 is used with connection to a universal character terminal such as VT 100 for using this connector 34. It is possible to set the communication path control such as SNMP (Simple Net Work Management Protocol; network management protocol) unit using a universal interface control protocol through a network such as the Ethernet without using this connector 34.

As described herein above, the unit having the structure with the box panel provided with the universal connector for connecting the data path control device 1 to communication lines and having a function to receive data transmitted through the satellite line can be used as a connection adapter regardless of the type of a computer and is served to connect simply between networks.

Next, a communication path control method for path control of the data transmitted/received between the computer and external networks using the data path control device 1 is described. An example for describing acquisition of the data stored in the computer 8 connected to the Internet using the computer 2a is described.

Figure 5:
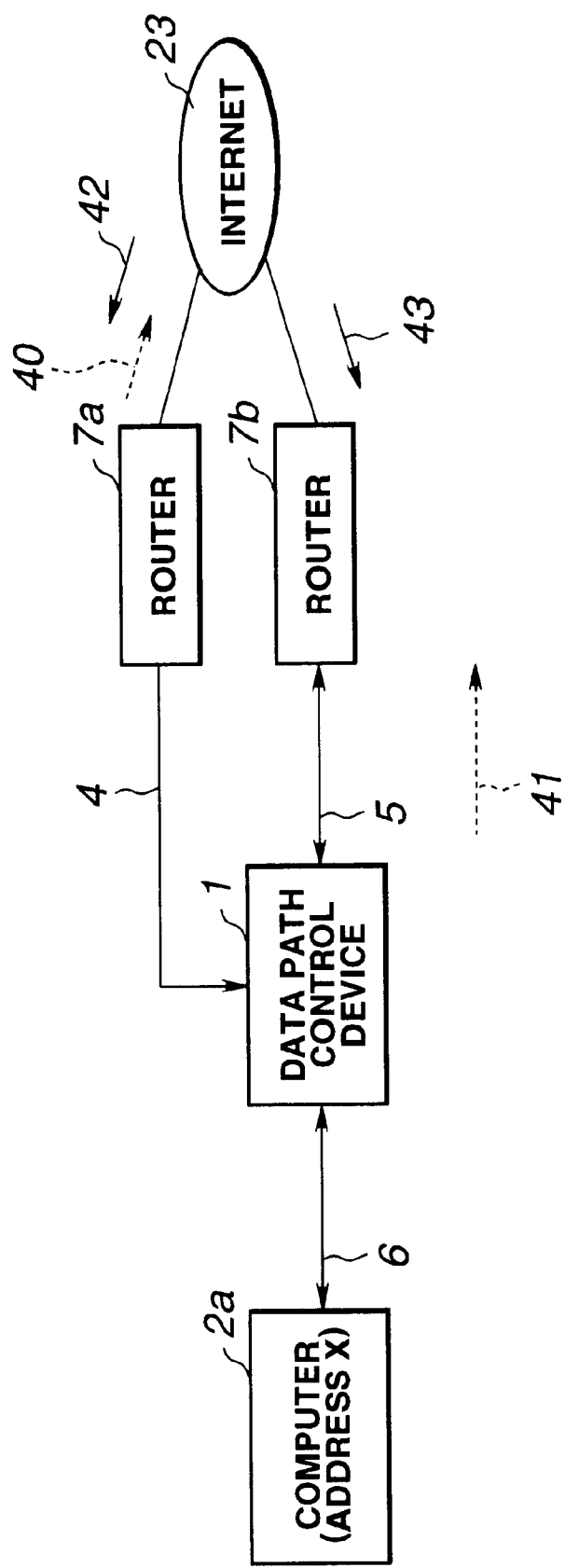
FIG. 5 is a diagram for illustrating the communication path control method of the present invention.

FIG. 5 shows a schematic flow of data in the data path control device 1. When a computer user 2a wants to use various services provided from the Internet 23, the user takes accesses the router 7b that is an access point of the service provider. A packet of the data acquisition request transmitted from the computer 2a is delivered to the data path control device 1 by way of usual control in LAN 6. Then, the data path control device 1 transmits the above-mentioned packet to the small capacity two-way line 5 which is judged to be a proper interface based on the destination of the packet. The content of the packet is then re-written as required based on the type of this packet.

The rewriting is performed for controlling the path of a return data from the computer 8 connected to the Internet 23. More specifically, the information of the sender data included in the information is re-written. The information of the data sender is, for example, a source address in the packet in the case that the packet is an IP (Internet protocol) packet.

The data path control device 1 stores a program and data used for determining which line should be selected to return a reply data respondent to the packet from the LAN out of the one-way large capacity line 4 and the small capacity two-way line 5, and first a return path is determined using the program and data. Then, the data path control device 1 rewrites the information in the packet along the determined return path or sends the entire packet to the small capacity two-way line 5. The above-mentioned rewriting operation will be described hereinafter.

In the data transmitted from the computer 2a having an assigned address of X to the Internet 23, the address X is included as the sender address. The router 27a which is connected between the large capacity one-way line 4 and the Internet 23 provides a path information of the address Y to the Internet. When data are transmitted from the Internet 23 to the address Y, the data is transmitted first to the router 27a, and then the data is delivered to the data path control device 1 through the large capacity one-way line 4.

The data path control device 1 provides a path information of the address Z to the Internet 23, and when data is transmitted from the Internet 23 to the address Z, the data is transmitted first to the router 27b, and then the data is delivered to the data path control device 1 through the small capacity two-way line 5.

The data path control device 1 re-writes the address portion of the sender of the data transmitted from the computer 2a having the address X using the above-mentioned operation. In detail, to return reply data through the large capacity one-way line 5, the address portion of the sender is changed to the address Y and transmitted to the Interface 23. To return reply data through the small capacity two-way line 4, the address portion of the sender is changed to the address Z and transmitted to the Internet 23. The data control device 1 controls the return path of the data according to this operation.

In the description herein above, three addresses of X, Y, and Z are used, however actually, in some cases, the address X is the same as the address Z, or the address X is the same as the address Y.

As a detailed example of using X, Y, and Z different from each other, the case of X for a private address, Y for a satellite path global address, and Z for an address assigned for dial-up connection from an Internet service provider are exemplified.

A detailed example of using X and Y which are the same, is illustrated by the case that usually a global address is assigned to a computer of an Internet user and the user receives the data through the large capacity one-way line 4 of the satellite, and only when the user wants to receive the data from a terrestrial small capacity two-way line 5, the address is changed from X to Z in the data path control device 1.

A detailed example of using X and Z which are the same, is illustrated by the case that usually a global address used for a terrestrial two-way Internet access is assigned to a computer of a user, and only when the user wants to receive the data from the large capacity one-way line 4 of the satellite, the address of a sender in the request data is changed from X to Y.

The address mentioned herein includes not only merely the IP address but also combination of the IP address and TCP/UDP port number. Therefore, operation for changing only a port number of the same address is included in the above-mentioned address change operation.

The data flow is described again with reference to FIG. 5. The request data which was subjected to address change properly in the data path control device 1 is delivered to the router 7b connected to the Internet through the small capacity two-way line 5, and is delivered to a computer connected to the Internet 23 according to a usual path control method of the Internet.

The computer 8 transmits the requested data to the computer 2a. The address of the sender who requested the data is loaded on the address of the data. Thereby, the data transmitted to the Internet 23 from the computer 8 is delivered to the router 7a or router 7b according to the path control as set by the data path control device 1. The reply data delivered to the router 7a is delivered to the data path control device 1 through the large capacity one-way line 4, and in the case that the address was changed when the request data is transmitted, the original user's address of the computer 2a user is changed to the address of the destination, and the data is transferred to the computer 2a.

The reply data delivered from the Internet 23 to the router 7b is delivered to the data path control device 1 through the small capacity two-way line 5, and in the case that the address is changed when the request data is transmitted, the address of the destination is changed to the address of the computer 2a of the original user and the reply data is transferred to the computer 2a of the user. The above-mentioned flow is the data flow.

Selection strategy of a line out of the large capacity one-way line 4 and the small capacity two-way line 5 actually to be based thereon depends on the user, depends on the computer connected to the Internet which transmits data, or depends on the content of the application.

In the case that the line is selected depending on the user, the IP address of the sender is checked, it is compared with the address registered in the data path control device 1, and the address is changed as registered.

In the case that the line is selected depending on the computer which sends back the data, the IP address of the destination is checked, and the address is changed similarly.

In the case that the line is selected depending on the content of the application, the port number of PCP/UDP is checked, and address is changed similarly.

In any case, it is required to set the path control in view of the delay characteristics of the respective lines and the communication content. Typically, the IP multi-cast data can be transmitted efficiently by way of a large capacity one-way line. For applications which require a small RTT (Round Trip Time), it is often better to transmit by way of a two-way terrestrial line in spite of small capacity because of large delay of a satellite line.

Here, a case is assumed that a large scale one-way line can transmit the data to many data path control devices 1 simultaneously like a satellite line. In this case, it is required that the data addressed to some data path control device is prevented from being received by an improper data path control device. Multiplexed data addressed to many data path control devices can be transmitted simultaneously in the case of a satellite line and the data are received only when the address of a data packet is identical with the address registered in each data path control device. Thereby, reception of useless data is reduced, and the load for data transfer processing is reduced.

The set function of all the data path control devices is set narrow so that data addressed to other path control devices are not received, and thereby the data addressed to the addressed computer are received safely without being intercepted by other data path control devices.

The data on the line is scrambled and each data path control device has a specified key, and thereby the data can be transmitted so that only the data path control device having the specified key can receive the data. Alternatively, a key is kept by a group of data path control devices, not by each data path control device, and thereby the data path control devices which belong to a specific group can receive the data. As a method for scrambling, DES (Data Encryption Standard) or "MULTI2" (brand name) supplied from Hitachi, Ltd. may be used.

For the data path control device 1, path control information and an interface for setting information for dial-up connection are required. The simplest way is to provide an interface for connecting to the setting terminal in addition to the above-mentioned three network interfaces as used usually for a router. In this case, the above-mentioned setting is performed with aid of a connected universal terminal such as "VT100" (brand name) supplied from Digital Equipment Co. Alternatively, a method in which the setting is performed using an interface such as GUI from the computer 2 through the LAN may be used.

Next, the structure of a data packet transmitted through the above-mentioned communication path control device is described.

Figure 6:
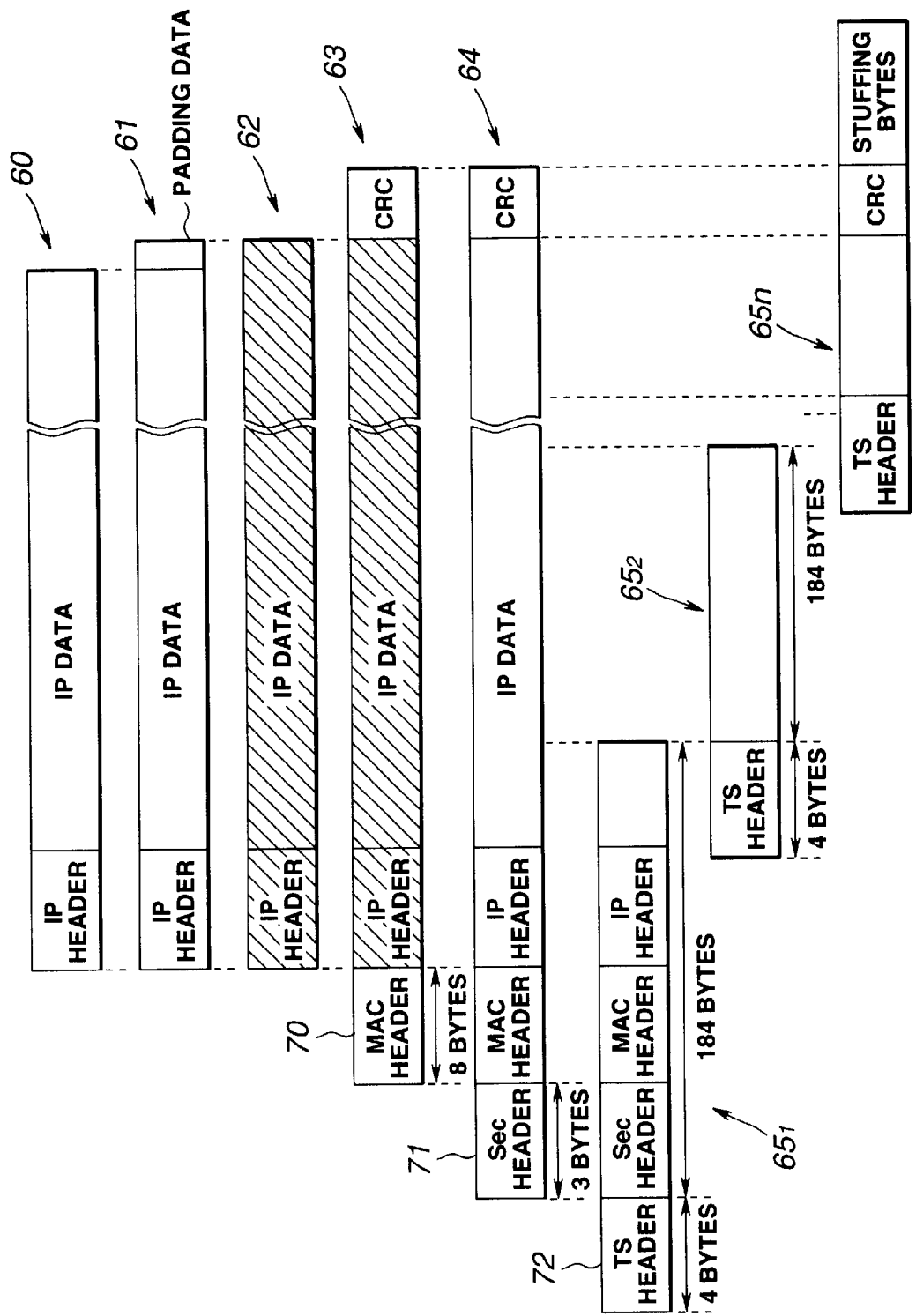
FIG. 6 is a diagram for illustrating the structure of the IP packet.

FIG. 6 shows the structure of IP packets. The size of an IP packet is specified by TCP/IP (Transmission Control Protocol/Internet Protocol). If the size of the data requested by a user exceeds the specified size, the data divided into a plurality of IP packets are transferred.

Figure 7:
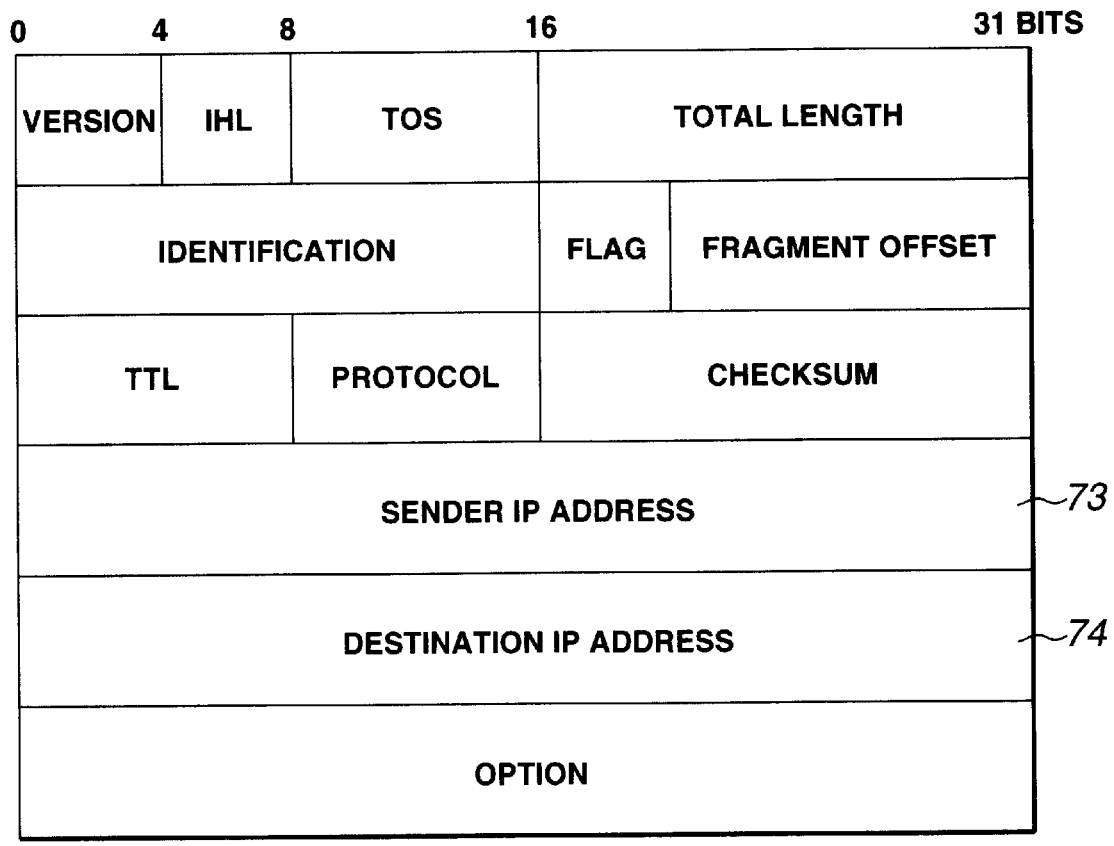
FIG. 7 is a diagram for illustrating the structure of the IP header.

FIG. 7 shows the structure of the header portion of the IP packet 60. A destination IP address 74 of a user and IP address 73 of the sender are loaded on the IP header portion. The destination IP address 74 is composed of 32 bits.

FIG. 8 shows an example of a path control table. The type of this table is the same as that used usually for a router. If a host of the destination is specified on the table A, the IP packet addressed to the host is transferred to the specified destination. In this case, the portion indicated by the indication code 82 shows an example.

On the other hand, if the host of the destination is not listed on the table, the network of the destination is retrieved on the table A, and if the network is found, it is transferred to the specified destination. In this case, the portion shown on the indication codes 81, 83, and 84 corresponds to the case.

If the network of the destination can not be found on the Table A, the path of default is retrieved, and the default is transferred to the specified destination. In this case, the portion shown on the indication code 85 corresponds to the case. In the case that no path of the default is found, an error is returned.

The setting of the path control table can be performed statically or dynamically using a universal routing protocol such as RIP (Routing Information Protocol) or OSPF (Open Shortest Path First).

FIG. 9 shows another example of a path control table. The path control table B judges whether the satellite line or the telephone line is assigned as the return path. The judgement is performed based on the IP address of a destination host corresponding to the portion shown with the indication code 91, the network address of a destination corresponding to the portion shown with the indication code 92, the port number of a destination corresponding to the portion shown with the indication code 93, or the combination of the IP address and port of a destination corresponding to the portion shown with the indication code 94, and alternatively the sender corresponding to the portion shown with the indication code 95. The default return path corresponding to the portion shown with the indication code 96 may also be specified.

FIG. 10 shows the type of an address conversion table. This is a memory for storing the correspondence between the address and port number of the LAN side and the IP address and the port number of the Internet side such as the telephone line and the satellite line. In the case that the port number is used as the judgement base for address conversion, the correspondence of the port number is written as shown with the portion of the indications code 101. On the other hand, in the case that the port number is not used for address conversion, the correspondence of only the IP address is stored as shown with the portion of the indication code 102.

Figure 11:
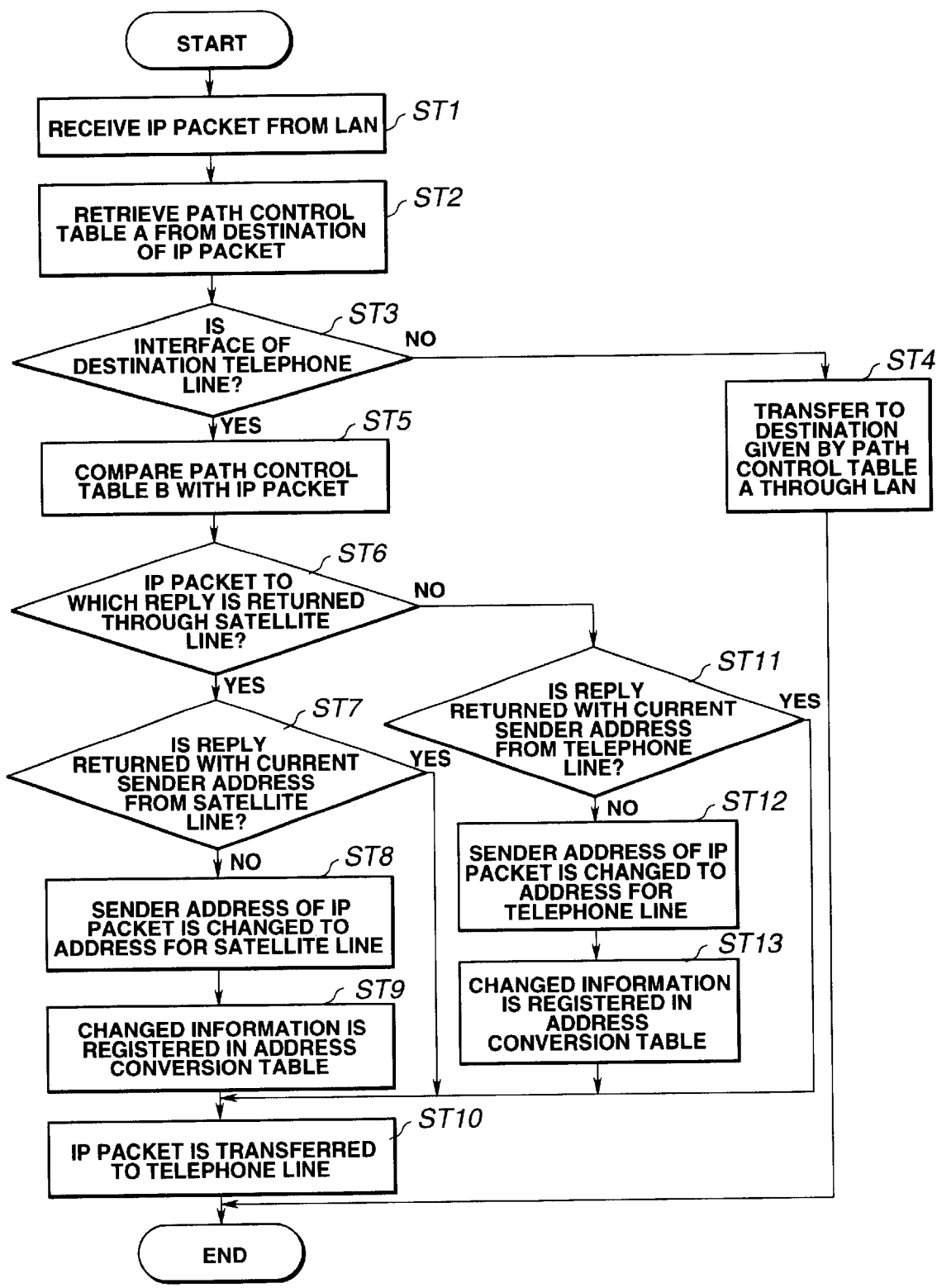
FIG. 11 is a flow chart for describing the sequence for processing the data transmitted from a LAN.
Figure 12:
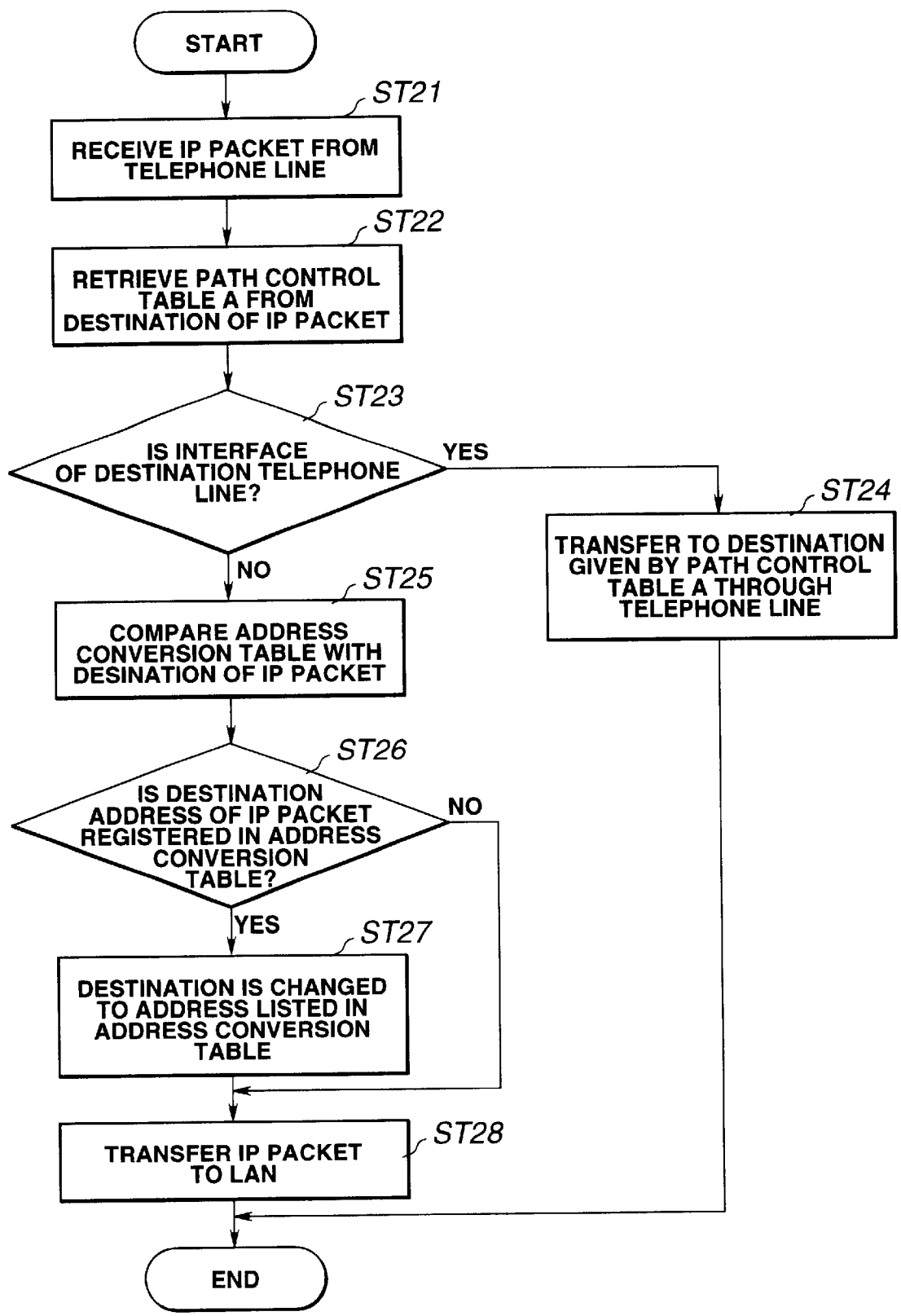
FIG. 12 is a flow chart for describing the sequence for processing the data transmitted from a telephone line.
Figure 13:
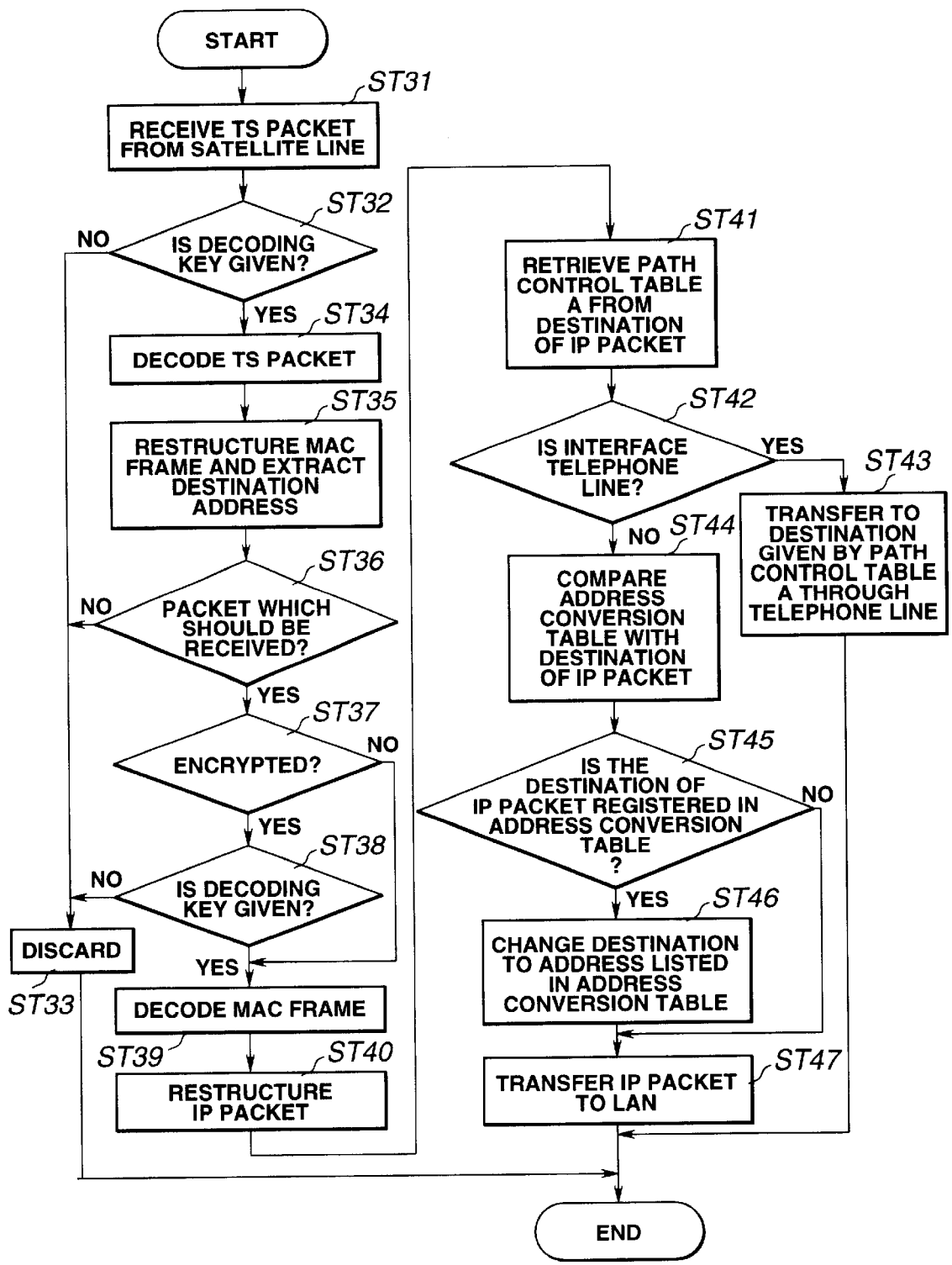
FIG. 13 is a flow chart for describing the sequence for processing the data transmitted from a satellite line.

Next, the detailed operation sequence of the above-mentioned communication path control device of the present invention to which the communication path control method of the present invention is applied is described with reference to the drawings. FIGS. 11 to 13 are flow charts for describing the sequence for processing the data inputted respectively from the above-mentioned three interface sections provided with a data path control device 1.

FIG. 11 is the flow chart for describing the sequence for processing the data inputted from the LAN 6 in the data path control device 1. In the case that ARP or RARP is inputted instead of an IP packet, a proper reply is returned to the LAN. Basically, in the case that an IP packet is transferred to the Internet after completion of usual transfer processing to be performed by a router using a protocol such as RIP or OSPF, the IP address and the port number in addition to the return packet are converted with reference to the path control table B which was set previously. In this case, re-calculation of the check sum of the IP header and TCP/UDP header, subtraction of PORT of FTP, and conversion of a reply character string of a PASV command are also carried out.

In the step ST1, an IP packet is received from the LAN 6.

In the step ST2, the path control table A is retrieved based on a destination address in the IP packet.

In the step ST3, whether the interface of the destination shown in the control path table is a telephone line is judged. If the interface of the destination is not a telephone line, the sequence proceeds to the step ST4. On the other hand, if the interface of the destination is judged to be a telephone line in the step ST3, the sequence proceeds to the step ST5.

In the step ST4, the packet is transferred to the destination indicated in the path control table A through the LAN.

In the step ST5, the IP packet is compared with the path control table B.

In the step ST6, whether this IP packet is an IP packet to which reply data from the external network should be returned through the satellite line is judged. If the reply data should not be returned through the satellite line, then the sequence proceeds to the step ST11. On the other hand, if the reply data should be returned through the satellite line, then the sequence proceeds to the step ST7.

In the step ST7, whether the reply data will be returned from the satellite line with the current sender address is judged. If the reply data is returned with the current sender address, then the sequence proceeds to the step ST10, and the sequence comes to an end. On the other hand, if the reply data is not returned from the satellite line with the current sender address, the sequence proceeds to the step ST8.

In the step ST8, the address of the IP packet is changed from the sender address to an address for the satellite line.

In the step ST9, the changed information is registered in the address conversion table.

In the step ST10, the IP packet is transferred to the telephone line, and the sequence comes to an end.

On the other hand, in the step ST11, whether a reply will be returned from the telephone line with the current sender address is judged. If the reply data is returned from the telephone line, then the sequence proceeds to the step ST10, and comes to an end. On the other hand, if the reply data is not returned from the telephone line with the current sender address, then the sequence proceeds to the step ST12.

In the step 12, the sender address of the IP packet is changed to the address for the telephone line.

In the step ST13, the changed information is registered in the address conversion table. Then, the sequence proceeds to the step ST10, and comes to an end.

Through the above-mentioned sequence, the data from the LAN is processed.

FIG. 12 is a flow chart for describing the processing sequence operated when data are inputted from the telephone line in the data path control device 1.

In the step ST21, an IP packet is received from the telephone line.

In the step ST22, the path control table A is retrieved based on the destination address in the IP packet.

In the step ST23, whether the interface of the destination shown on the path control table A is a telephone line is judged. If the destination interface is a telephone line, the sequence proceeds to the step ST24. On the other hand, if the destination interface is not a telephone line, then the sequence proceeds to the step ST25.

In the step ST24, the packet is transferred to the destination indicated in the path control table A, and the sequence comes to an end.

In the step ST25, the destination of the IP packet is compared with the address conversion table.

In the step ST26, whether the destination address of the IP packet is registered in the address conversion table is judged. If the result is NO, then the sequence proceeds to the step ST28. On the other hand, if the result is YES, then the sequence proceeds to the step ST27.

In the step ST27, the address is changed to an address listed on the address conversion table.

In the step ST28, the IP packet is transferred to the LAN, and the sequence comes to an end.

Through the above-mentioned sequence, the data from the telephone line is processed.

FIG. 13 is a flow chart for describing the processing sequence operated when data is inputted from the satellite line in the data path control device 1. In this case, the processing is different from the processing on the data from other interfaces in that the data is encrypted in some cases and such data is decoded for restoration.

A decoding key for decoding the encrypted data is set by performing a prescribed setting operation on the data path control device from an external host using an exclusively used application. In this case, a TS packet is transmitted instead of the IP packet.

In the step ST31, the TS packet is received from the satellite line.

In the step ST32, whether a decoding key for decoding the encrypted TS packet is given is judged. If the decoding key is not given, then the sequence proceeds to the step ST33, the data are discarded, and the sequence comes to an end. On the other hand, if the decoding key is given, then the sequence proceeds to the step ST34.

In the step ST34, the TS packet is decoded.

In the step ST35, MAC frame is re-structured from the decoded ST packet, and the destination address is extracted.

In the step ST36, whether the packet which constitutes, the MAC frame is a packet which should be received is judged. If the packet is not a packet which should be received, then the sequence proceeds to the step ST33, the packet is wasted, and the sequence comes to an end. If the packet is a packet which should be received, then the sequence proceeds to the step ST37.

In the step ST37, whether the received packet is encrypted is judged. If the packet is not encrypted, then the sequence proceeds to the step ST39. On the other hand, if the packet is encrypted, then the sequence proceeds to the step ST38.

In the step ST38, whether a decoding key is given is judged. If the decoding key is not given, then the sequence proceeds to the step ST33, the packet is wasted and the sequence comes to an end. On the other hand, if the decoding key is given, then the sequence proceeds to the step ST39.

In the step ST39, the MAC frame is decoded.

In the step ST40, the IP packet is re-structured.

In the step ST41, the destination of the IP packet retrieves the path control table A.

In the step ST42, whether the destination interface indicated on the above-mentioned path control table is a telephone line is judged. If the destination interface is judged to be a telephone line, then the sequence proceeds to the step ST44.

In the step ST44, the data is transferred to the destination given on the above-mentioned path control table A through a telephone line.

On the other hand, in the step ST42, if the destination interface is judged not to be a telephone line, then the sequence proceeds to the step ST44.

In the step ST44, the IP packet is compared with the address conversion table.

In the step ST45, whether the destination of the IP packet is registered on the address conversion table is judged. If the destination is not registered on the address conversion table, then the sequence proceeds to the step ST47. On the other hand, if the address is registered, the sequence proceeds to the step ST46.

In the step ST46, the address is changed to an address listed in the address conversion table.

In the step ST47, the IP packet is transferred to the LAN and the sequence comes to an end.

Through the above-mentioned processing sequence, the data from the satellite line is processed.

FIGS. 14A to 14D show the data format from the satellite line the processing sequence of which was described with reference to FIG. 13.

FIG. 14A shows TS packets of MPEG2 composed of 188 bytes respectively transmitted from the satellite line. Decoded TS packets $140_1$ to $140_n$ are combined to form a MAC (Media Access Control) frame 141 shown in FIG. 14B. In the case that the data portion of the MAC frame 141 is encrypted, the MAC frame 141 is decoded. The MAC frame is based on the format determined by DAVIC. If the data portion of the MAC frame is a fragmentized IP packet and the IP packet is addressed to this data path control device, then all the fragments $142_1$, $142_2$, $142_3$, . . . are collected and the original IP packet 143 is re-structured as shown in FIGS. 14C and 14D. On the other hand, If the fragmentized IP packet is not addressed to this data path control device, the fragmentized IP packet is transferred as it is to the interface of the LAN.

According to the communication path control device and communication path control method of the present invention, a large capacity line such as a satellite line can be selected as a path of a reply data from a network based on the data transmitted from a computer to the external network, and thereby, large capacity reply data can be transferred within a short time.

According to the communication path control unit of the present invention, the plurality of interface sections such as the interface section for a satellite line provided with the data reception function from the satellite line, interface section for LAN, and interface section for telephone lines, and the communication path control function for selecting a communication path between them based on the transmitted data are contained in a compact box, and further line connection terminals of the respective interfaces are structured on the box panel using universal connectors. Thereby, the communication path control unit of the present invention serves as a communication path control device used as an external adapter for various computers regardless of the type of a computer.

What is claimed is:

1. A communication path control device for controlling communication paths between a first network and a second network comprising:

a first interface section for connecting to said first network, wherein said first network is a local area network;

a second interface section for connecting to a first communication path for two-way data transfer with said second network, wherein said second network includes an internet;

a third interface section for connecting to a second communication path having a transmission capacity larger than said first communication path for one-way data transmission from said second network to said first network; and control means for selecting one of said first communication path and said second communication path as a return path for reply data responsive to an internet protocol packet transmitted from said first network to said second network through said first communication path, wherein data transferred from said second network through said second communication path is data generated by multiplexing a plurality of data addressed to a plurality of destinations, and said control means selects data to be received with reference to a destination address in a packet of multiplexed data.

2. The communication path control device as claimed in claim 1, wherein said second communication path is a satellite broadcast line.

3. The communication path control device as claimed in claim 1, wherein said second communication path is a cable television broadcast line.

4. The communication path control device as claimed in claim 1, wherein said first communication path is a telephone line.

5. The communication path control device as claimed in claim 1, wherein said control means selects said return path of said reply data by changing a sender address in said internet protocol packet transmitted from said local area network to a different address.

6. The communication path control device as claimed in claim 1, further comprising control information memory means for storing a previously set relationship between address information of said local area network and port number information, and between address information of said internet and said port number information.

7. The communication path control device as claimed in claim 5, wherein said different address is selected based on said sender address and stored address information.

8. The communication path control device as claimed in claim 5, wherein said different address is selected based on a port number of transmission control protocol/user data gram protocol of a sender and previously set port number information.

9. The communication path control device as claimed in claim 5, wherein said different address is selected based on said sender address and previously set address information.

10. The communication path control device as claimed claim 5, wherein said different address is selected based on a port number of transmission control protocol/user data gram protocol of a destination address and previously set port number information.

11. The communication path control device as claimed in claim 1, wherein said return path of said reply data is selected by changing a sender address in said internet protocol packet transmitted from said local area network and a port number of transmission control protocol/user datagram protocol to a different address and a different port number.

12. The communication path control device as claimed in claim 1, further comprising descrambling means for decoding scrambled multiplexed data by using a specific key.

13. The communication path control device as claimed in claim 12, wherein said specific key is specific to said communication path control device which releases said scrambled multiplexed data.

14. A communication path control method for controlling communication paths between a first network and a second network, comprising the steps of:

transferring an internet protocol packet inputted from said first network through a first interface section to a second interface section, wherein said first network is a local area network;

transferring said internet protocol packet from said second interface section to a first communication path formed for two-way data transmission with said second network, wherein said second network included an internet;

outputting reply data responsive to said internet protocol packet to a third interface section through a second communication path formed for one-way transmission of data from said second network to said first network, said second communication path having a transmission capacity larger than said first communication path; and selecting one of said first communication path and said second communication path as a return path for said reply data responsive to said internet protocol packet transmitted from said first network to said second network through said first communication path, wherein data transferred from said second network through said second communication path is data generated by multiplexing a plurality of data addressed to a plurality of destinations, and data is selected to be received with reference to a destination address in a packet of multiplexed data.

15. The communication path control method as claimed in claim 14, further comprising the step of selecting said return path of said reply data by changing a sender address of said internet protocol packet to a different address.

16. The communication path control method as claimed in claim 15, further comprising the step of selecting said different address based on said sender address and previously set address information.

17. The communication path control method as claimed in claim 15, further comprising the step of selecting said different address based on a port number of transmission control protocol/user datagram protocol of a sender and previously set port number information.

18. The communication path control method as claimed in claim 15, further comprising the step of selecting said different address based on a destination address and previously set address information.

19. The communication path control method as claimed in claim 15, further comprising the step of selecting said different address based on a port number of transmission control protocol/user data gram protocol of a destination and previously set port number information.

20. The communication path control method as claimed in claim 14, further comprising the step of selecting said return path of said reply data by changing a sender address in said internet protocol packet transmitted from said first network and a port number of transmission control protocol/user data gram protocol of a sender to another address and another port number respectively.

21. A communication path control unit for controlling communication paths between a local area network and an internet comprising:

a first interface section having a first connection section for connecting to said local area network;

a second interface section having a second connection section for connecting to a first communication path for two-way data transmission with said internet;

a third interface section having a third connection section for connecting to a second communication path having a transmission capacity larger than said first communication path for one-way data transmission from said internet to said local area network;

reception means for receiving satellite broadcast data inputted to said third interface section;

control information memory means for storing a previously set relationship between address information of said local area network and port number information, and between address information of said internet and port number information; and control means for selecting one of said first communication path and said second communication path as a return path for reply data responsive to an internet protocol packet transmitted from said local area network to said internet through said first communication path, wherein data transferred from said second network through said second communication path is data generated by multiplexing a plurality of data addressed to a plurality of destinations, and said control means selects data to be received with reference to a destination address in a packet of multiplexed data.

22. The communication path control unit as claimed in claim 21, wherein said second communication path is a satellite broadcast line.

23. The communication path control unit as claimed in claim 21, wherein said second communication path is a cable television broadcast line.

24. The communication path control unit as claimed in claim 21, wherein said first communication path is a telephone line.

25. The communication path control unit as claimed in claim 21, wherein said control means selects said return path of said reply data by changing a sender address in said internet protocol packet transmitted from said local area network to a different address based on said previously set relationship between said address information of said local area network and said port number information, and between said address information of said internet and said port number information stored in said control information memory means.

26. The communication path control unit as claimed in claim 21, wherein said first connection section and said second connection section are connectable to a telephone line, and said third connection section is connectable to a coaxial cable.

27. The communication path control unit as claimed in claim 21, further comprising a fourth connection section for connecting external setting means for setting an external setting terminal means to change a setting of said control information memory means.

28. The communication path control unit as claimed in claim 21, wherein said internet protocol address of a computer connected to said local area network is set using a dynamic host configuration protocol.

29. The communication path control unit as claimed in claim 21, wherein said control means sets a reception frequency and a packet identifier for a signal inputted from a satellite line through said third connection section.

* * * * *